Patented Sept. 17, 1935

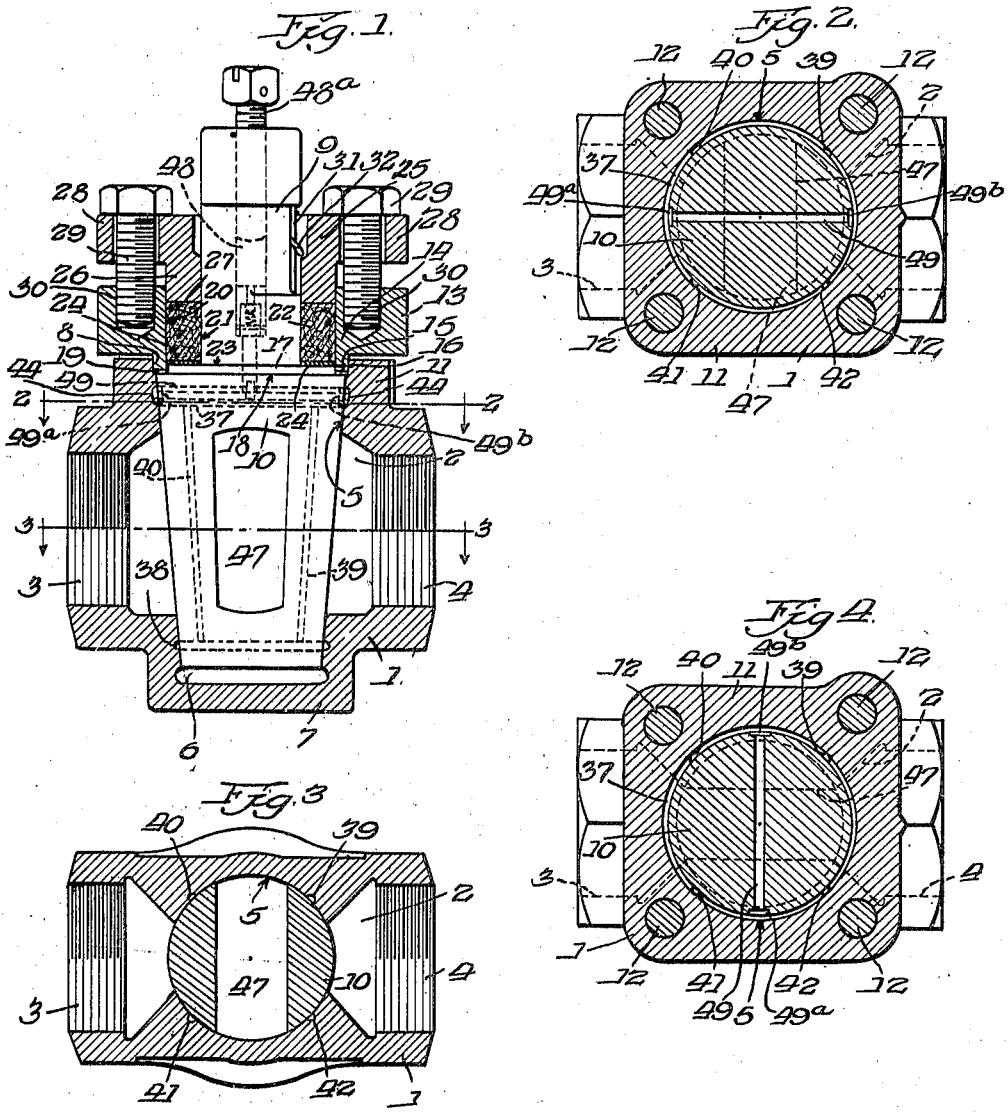

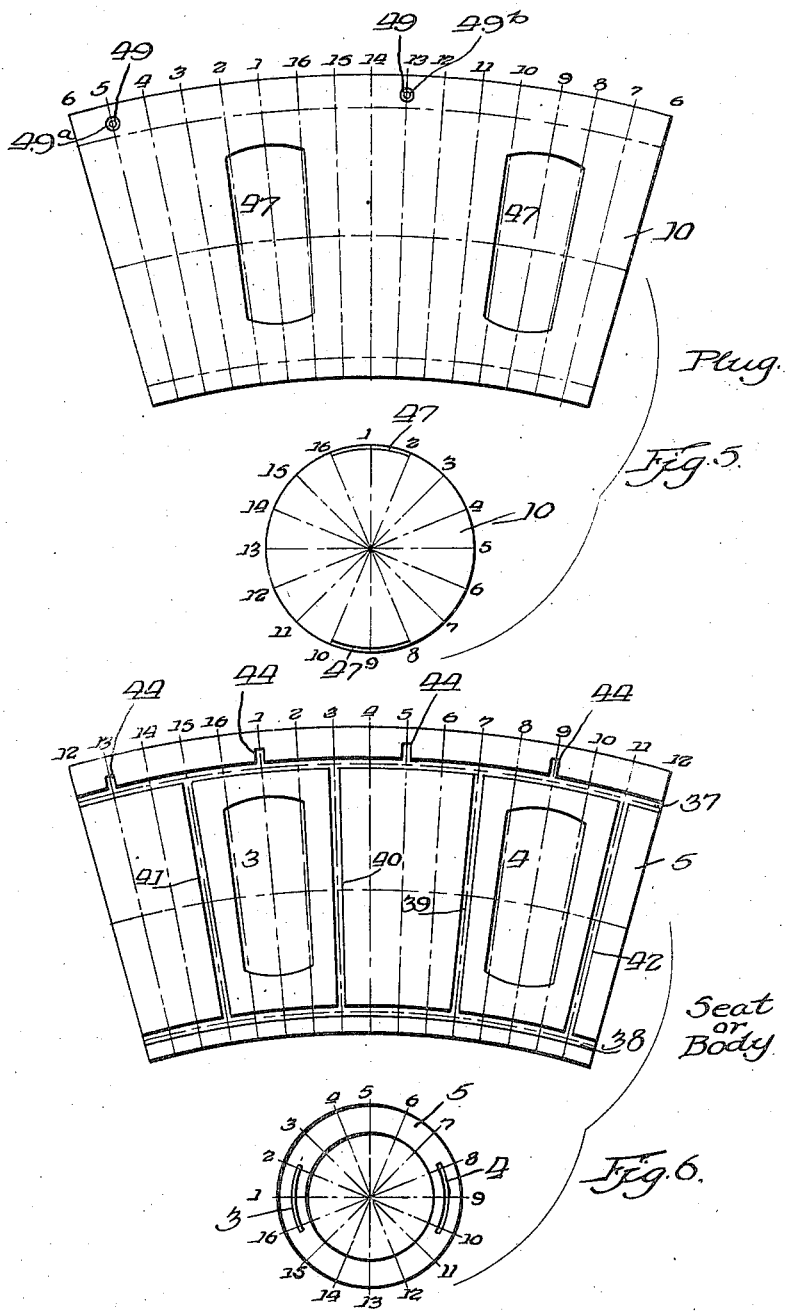

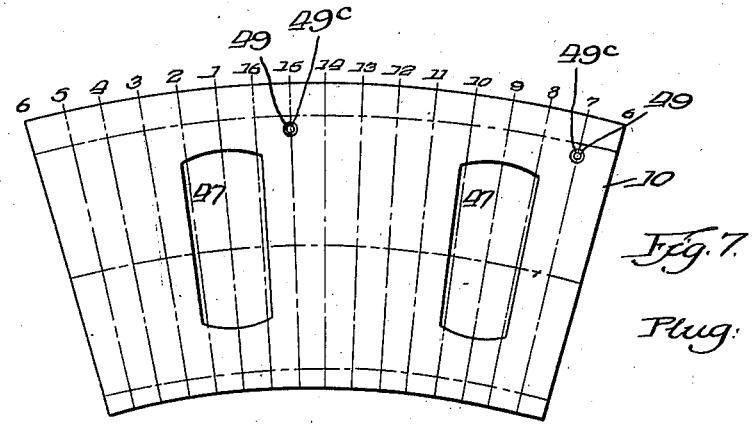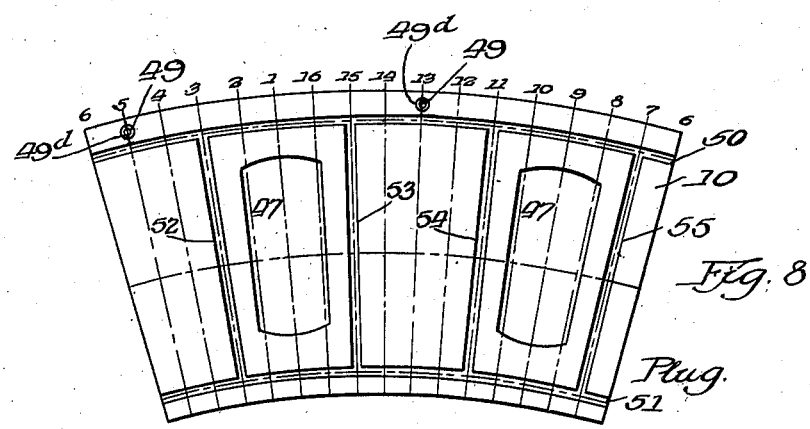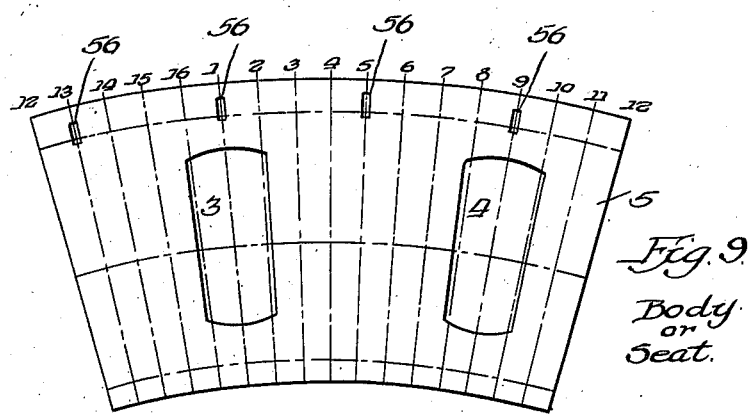

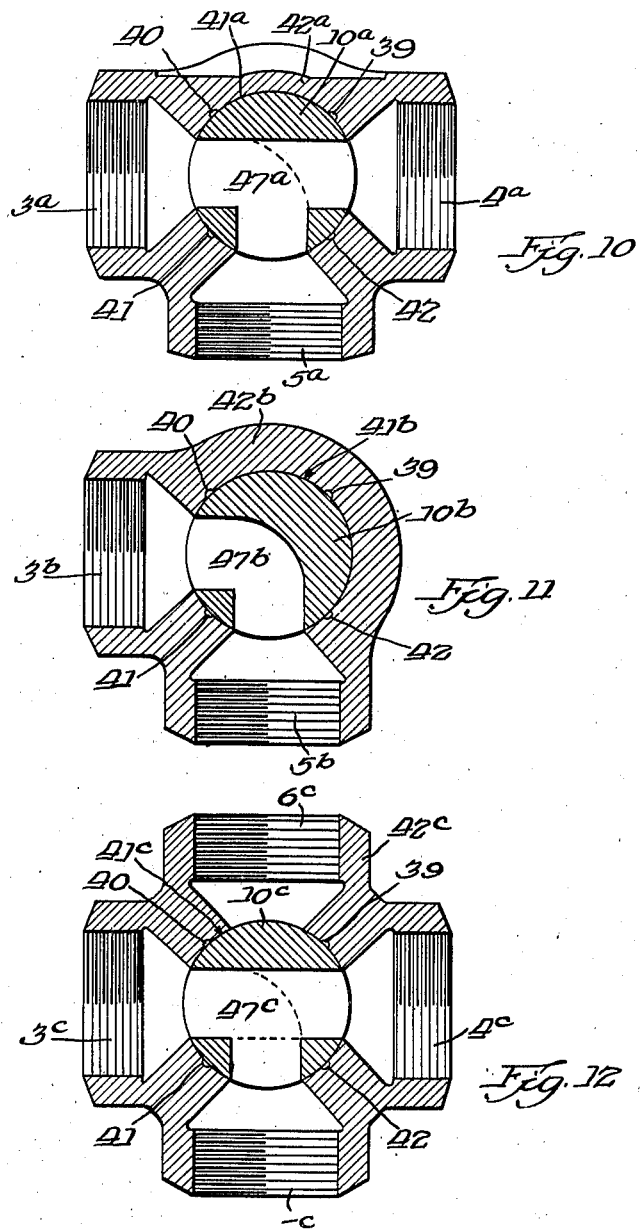

2,014,481

UNITED STATES PATENT OFFICE 2,014,481

PLUG VALVE

French Hugh Morehead, Brookline, Mass., assignor to Walworth Patents, Inc., Boston, Mass., a corporation of Massachusetts Application February 29, 1932, Serial No. 595,822

16 Claim. (Cl. 251—93)

This invention relates in general to valves and more particularly to that type of valve known as a rotating plug valve, and has special reference to improvements in means for supplying a lubricant to the surface of contact between the valve member and its seat.

While this invention is described and illustrated as incorporated in a plug valve, it will be understood that certain features of the invention may be employed for analogous structures and that the invention therefore finds a wide field of utility.

The present invention includes as its principal objects the provision of an improved arrangement of lubricant conduits or grooves in the seating surface for conducting lubricant quickly and conveniently to the entire seating surface; the provision of an improved arrangement of the lubricant conducting means wherein a substantially complete lubricant seal is provided around at least one of the valve passages when in certain positions; the provision of an improved arrangement of lubricant grooves wherein lubricant contained in a major portion of the grooves is maintained out of contact with the fluid in the pipe line; the provision of an improved arrangement of lubricant grooves whereby the entire seating surface is lubricated when the valve member is rotated from full-open to full-closed positions; the provision of an improved arrangement of lubricant conducting grooves in the surface of contact of the valve and its seat wherein those portions of the valve and seat having the greatest area of active contact are adequately lubricated in all positions of the valve; the provision of an arrangement of controls of lubricant feed to the grooves such that when the valve is in intermediate position between full-open and full-closed positions certain of the grooves, that is, those which come in contact with the fluid in the pipe line are disconnected from the lubricant supply so that all the lubricant does not flow off into the pipe line and thus become lost and thus permitting the valve to be rotated, if desired, through the entire 360° without stops; the provision of an improved arrangement of lubricant grooves in the seating surfaces of the valve member and the valve seat, and means for putting the lubricant in said grooves under pressure when the valve is in full-open or full-closed position whereby the valve member may be moved longitudinally with relation to its seat, and also, in some instances, the valve member may be compressed and/or the valve body expanded by said lubricant pressure in order to facilitate operation and to permit the lubricant to spread over the seating surface; and, the provision of improved lubricant conducting means so arranged that in both full-open and full-closed positions of the valve a lubricant seal is provided around the valve port and the passageways for line fluid.

The foregoing and such other objects and advantages as may appear, or be pointed out, as this description proceeds are attained in the structural embodiment of the invention as illustrated in the accompanying drawings, in which:

Figure 1 is a longitudinal sectional view, taken through a valve incorporating the improvements of this invention;

Figure 2 is a transverse sectional view taken on the line 2—2 of Figure 1 looking in the direction indicated by the arrows;

Figure 3 is a transverse sectional view taken on the line 3—3 of Figure 1 looking in the direction indicated by the arrows;

Figure 4 is a view similar to Figure 2 except that the valve member is shown in full-open position;

Figure 5 is a geometrical development of the contacting surface of the valve member as shown in Figure 1;

Figure 6 is a view similar to Figure 5 showing a geometrical development of the valve body or seat;

Figure 7 is a geometrical development of an alternative form of the valve member contacting surface for use with valve seat as shown in Figure 6;

Figures 8 and 9 are geometrical developments of the contacting surfaces of the valve member and valve seat, respectively, showing an alternative arrangement of the lubricating grooves;

Figure 10 is a transverse sectional view similar to Figure 3 of an alternative form of the invention as adapted to a three-way valve;

Figure 11 is a transverse sectional view similar to Figure 3 showing an alternative form of the invention as adapted to a valve with the ports at substantially right angles to each other;

Figure 12 is a transverse sectional view similar to Figure 3 showing an alternative form of the invention as adapted to a four-way valve.

Referring now to the drawings, and more particularly to the Figures 1 to 6 inclusive, I provide a valve body 1 having a transverse passageway 2 divided into the parts 3 and 4 by the valve seat 5. The valve seat 5 is of tapering configuration and extends to and communicates with a pocket 6 formed by a wall 7. The ends of the body 1 comprising the portions 3 and 4 of the fluid passageway 2 are threaded internally to provide a means of fitting the valve into a pipe line. This is for purpose of illustration only, as any other suitable means adaptable to size of pipe or nature of use may be utilized.

The upper end of valve seat 5 communicates with an opening 8, through which projects the reduced stem portion 9, of valve member 10. The valve member 10 is frusto-conical in shape, corresponding to the valve seat 5, and is inserted through the opening 8. The valve member 10 is perforated by a transverse port 47 which is so proportioned as to register with the openings in the valve seat 5 of transverse passageway 2 when said valve member is in open position. The valve body about opening 8 is so formed as to provide an annular flange 11 suitably apertured to receive the retaining bolts 12. These bolts pass through the annular flange 13 of a valve retaining member 14, whose inner peripheral bottom edge is provided with an annular inwardly directed flange 15. This flange 15 engages the peripheral face 16 of an annular shoulder 17 provided in the top of valve member 10. The annular face of flange 15 is spaced from the annular face 18 of shoulder 17 as indicated at 19 so as to permit of a movement of the valve off its seat in response to lubricant pressure introduced between the surface of contact of the valve and body.

The cylindrical surface 20 of the valve retaining member 14 acts with the opposed cylindrical surface 21 of the valve stem 9 to form a packing chamber or stuffing box, and within the space thus afforded I introduce a compressible or resilient packing 22. This packing may be formed of asbestos or of other suitable packing material of sufficient expansion strength to cause the valve to maintain its seat under normal conditions when said packing is compressed. Said packing engages the annular surface 23 of the top of valve member 10 through a thin metal washer 24, and, by virtue of the overlapping between flange 15 and shoulder 17, said packing, when compressed, cannot escape laterally from the stuffing box.

Pressing on the packing 22 I provide a gland 25 having an annular flange 26 projecting into the stuffing box and engaging the packing along face 27. The gland 25 is provided with projections 28 through which bolts 29 extend, engaging corresponding threaded holes 30 in valve-retaining member 14.

In order to form a limit stop for the plug valve member so that the same will be limited in motion to a quarter turn, I provide an arcuate recess 31 in a portion of the valve stem 9 and a stop lug 32 on the gland 25 projects into said recess, thus limiting the movement of the valve to predetermined angular displacement. This limit stop may, if desired, be eliminated as will appear hereinafter.

The alignment of the bolts 12 in the flange 14, and the relationship of the threaded openings 30 for receiving bolts 29 provide a means of insuring assembly of the various elements of the valve structure in their proper relation to each other, without any further means of adjustment.

The upper portion of the valve stem 9 is made square in form to facilitate the application of a suitable operative means for rotation of the valve member 10.

Important features of this invention are the provision of a positive and efficient means for lubricating the surface of contact of the valve member and body, and for lifting said valve member measurably from its seat by pressure exerted on said lubricant, and for these purposes I have provided an arrangement of grooves in the surface of contact of said valve member and body, in connection with a chamber for lubricant and means of placing said lubricant under pressure as disclosed below.

While I have referred herein to lifting the valve from its seat by lubricant pressure for lubricating the surfaces of contact, it is to be understood that in some instances a measurable so-called lifting may not take place, but actually either a measurable expansion of the valve housing and/or a compression or contraction of the valve member or plug may take place. In either event it will be understood that the longitudinal grooves are largely instrumental in causing a separation of the valve member and seat to such an extent that actual spreading of the lubricant over the surfaces thereof may take place.

As shown for purposes of illustration in the drawings, a lubricant compression chamber 48 is provided in the center of valve stem 9. The upper part of said lubricant chamber is threaded to receive bolt 48a by means of which pressure can be exerted on the lubricant in said lubricant chamber. From the lower portion of said lubricant chamber radial passageways 49 are provided for connection from said lubricant chamber to the arrangement of grooves as disclosed below. A check valve may be provided in the lower end of said lubricant chamber to prevent back pressure from the grooves when pressure on lubricant chamber is released as for re-filling.

The passageway or duct 49 extends to the exposed tapered surface of the valve member 10 and terminates in ends 49a and 49b, so that lubricant under compression in the chamber 48 will be delivered to the surface of contact between the valve member and its seat.

In the convenient form of my invention disclosed in the drawings, I provide in the exposed contact surface of the seat, a plurality of circumferential grooves, two of such grooves being conveniently provided as shown and indicated at 37 and 38. These grooves are provided near the top and bottom, respectively, of the valve seat. In said valve seat I also provide a plurality of longitudinal grooves, there being four of such groooves for convenience indicated at 39, 40, 41 and 42, which extend longitudinally of the valve seat and are permanently connected at their ends with the circumferential grooves 37 and 38 herein. It is to be understood that the grooves 39, 40, 41 and 42 are spaced around the circumference of the valve seat substantially equi-distantly, and so placed with respect to the openings of the transverse passageway 2, that is, the openings 3 and 4, that said openings are centered between respective pairs of said longitudinal grooves.

It will be understood, also, that the circumferential grooves 37 and 38 are so disposed longitudinally on the valve seat as not to be exposed to the port openings or to the liquid or fluid passing through the line during operation of the valve.

The arrangement of the longitudinal and transverse grooves in the contacting surface of the valve seat and the position of said grooves relatively between openings 3 and 4 is best shown in the geometrical development of said surface, Figure 6.

It will be understood that in the full-open and full-closed positions of the valve member, lubrication under pressure is supplied to the longitudinal and circumferential grooves in the valve seat but that in intermediate positions of the valve member this supply of lubricant is cut off by the said seating surfaces. One convenient manner of accomplishing this cut off is by the provision of the ends 49a and 49b of the duct 49 in a position in the valve member contacting surface above the groove 37, so that when the valve and its seat or body are assembled the ends 49a and 49b do not directly communicate with the grooves 37. In order to establish such communication, however, when the valve is in predetermined position, conveniently full-open and full-closed position, I provide a plurality of short lateral grooves 44, 44, which extend outwardly from the groove 37, that is, in a direction upwardly as viewed in Figure 6, said laterally directed grooves 44 being preferably four in number and arranged so that, when the valve member is in predetermined position, that is, full-open and full-closed position, the ends 49a and 49b of the duct 49 will communicate with one each of the grooves 44, these grooves being four in number and equi-distantly spaced about the circumference of the valve seat. Whenever the valve member is moved from full-open to full-closed position to any one of the intermediate positions, it will be observed that the supply of lubricant will be immediately cut off from the longitudinal and circumferential grooves in the valve seat, so that lubricant will not be washed out of the entire lubricant system due to exposure of some of the longitudinal grooves to line-flow when the valve is rotated in its seat.

As an alternative form of invention, reference may be had to Figure 7. In this form of invention, the lubricant chamber 48 and the duct 49 will be extended into the valve member below a plane drawn through the circumferential grooves 37 of Figure 6, so that the ends 49c of the duct 49 will lie below said groove 37, but above the adjacent margins of the openings 3 and 4 and valve port 47. In this arrangement, as shown in Figure 7, the port ends 49c, corresponding to one of the ends of the duct 49 shown in Figure 5, are conveniently placed on a line so that, when in full-open and full-closed positions of the valve member, the ends of the duct will communicate with one pair of the longitudinal grooves, thus delivering the lubricant thereto, but will be cut off from such communication upon turning of the valve to one of the intermediate positions. It will be understood that any convenient modification of the arrangement of the duct 49 may be resorted to in order to bring it into proper alignment with the longitudinal grooves in full-open or full-closed position. In the form of the invention in Figure 7 it will be understood that the short grooves 44, as shown on Figure 6, will not be required and these may be eliminated from the valve seat.

Another alternative arrangement of the lubricating grooves is disclosed in Figures 8 and 9 which are the geometrical developments of the contacting surface of the valve member and the seating surface of the valve body, respectively.

In the contacting surface of the valve member I provide a plurality of circumferential grooves, conveniently two such grooves 50 and 51, as shown, located near the top and bottom, respectively, of the contacting surface, and so placed as to be never exposed to the transverse openings 3 and 4 of the valve seat. In said contacting surface I also provide a plurality of longitudinal grooves, conveniently four such grooves as indicated at 52, 53, 54 and 55, which extend longitudinally of the valve seat and between and connecting with the said circumferential grooves 50 and 51. Said longitudinal grooves are spaced at substantially equal intervals around the circumference of the valve member, and are so placed with respect to the port openings of transverse port 47 that said openings are centered between respective pairs of said longitudinal grooves. The radial passageways 49 leading from the lubricant chamber 48 are so positioned as to terminate in the contacting surface of the valve member at a point substantially above the circumferential groove 50, as indicated at 49d. The above described arrangement of lubricant grooves is clearly shown in Figure 8.

In order to provide the desired connection between the lubricant passageway 49 and the circumferential groove 50 at certain predetermined positions of the valve member, conveniently full-open and full-closed position, I provide in the seating surface of the valve body a plurality of short longitudinal grooves 56, conveniently as shown four such grooves. Said short longitudinal grooves 56 are so placed longitudinally of said seating surface as to provide a disconnectible connection between said ends 49d of passageway 49 and said circumferential grooves 50 in the contacting surface of the valve member, and spaced at substantially equal intervals around the circumference of the valve seat.

It will be understood that in the several arrangements of the grooves as disclosed in Figures 1 to 9, when the valve is in full-open or full-closed position the lubricant under pressure in the lubricant chamber has access to all parts of the grooves in the surface of contact of the valve member and body, thus furnishing a means for the complete lubrication of said surface and a means, through application of pressure to said lubricant, to move the valve member longitudinally with relation to the valve seat against the compression of the packing 22, and/or to expand the valve body and compress the valve member.

Referring now to the alternative form of invention shown in Figure 10, a 3-way valve is there illustrated and the arrangement of the grooves 39, 40, 41 and 42 is such that these grooves are disposed, in the case of the grooves 39 and 40, in an uninterrupted surface 41a on the valve seat in the body 42a, and the grooves 41 and 42 are disposed between the passageways 3a and 5a and 5a and 4a, respectively, the valve member 10a having a T-shaped port, 47a, for establishing communication as desired, between the passageways 3a, 4a, and 5a.

As a further modification for certain purposes the port 47a could be made L-shaped as indicated by the dotted line on the drawings which would provide selective communication between openings 3a and 5a with 4a cut-off, or 4a and 5a with 3a cut-off.

It will be observed that in certain positions of the valve member 10a, in Figure 10, the longitudinal and circumferential grooves will form, similar to the grooves in Figure 6, complete lubricant seals around the openings of the passageways 3a, 4a and 5a, conveniently in the positions wherein the port in the valve member is in complete registration with the respective passageways 3a, 4a, or, 5a, or when valve member is of a construction and in position to fully close all three ports, as the case may be.

A further alternative form of the invention is shown in Figure 11, which is shown the adaptation of this invention to a two-way valve having the ports at substantially right angles to each other. The longitudinal grooves 39, 40, 41 and 52 are spaced at substantially equal intervals around the seating surface 41b of the valve body 42b, one of said grooves being placed between the port openings 3b and 5b which are at substantially right angles to each other. The valve member 10b is provided with an L-shaped port, 47b, for establishing communication between the port openings 3b and 5b. It will be observed that when valve member 10b is in full-open or full-closed positions, the longitudinal and circumferential grooves will form complete lubricant seals around the passageways 3b and 5b, and also around the ends of port 47b.

A further alternative form of the invention is shown in Figure 12, in which is shown the adaptation of this invention to a four-way valve. The longitudinal grooves 39, 40, 41 and 42 are spaced at substantially equal intervals around the seating surface 41c of the valve body 42c, one of said grooves being placed midway in each of the surfaces between the port openings of passageways 3c, 4c, 5c and 6c. The valve member 10c is provided with a port 47c which may be T-shaped as shown, or L-shaped or transverse as shown by the dotted lines, to provide the desired communication between the port openings of passageways 3c, 4c, 5c and 6c. It will be observed that when valve member 10c is in full-open position with respect to any combination of the several ports, the longitudinal and circumferential grooves will form complete lubricant seals around all of the port and passageway openings.

For convenience the arrangements of grooves as shown and described for the various forms of the invention shown by Figures 3, 10, 11 and 12, is that shown by Figures 5 and 6. However, it is to be understood that the alternate forms shown in Figure 7 and in Figures 8 and 9, respectively, are all equally adaptable to all forms of the invention.

It will be understood that in the several forms of the invention shown, when the valve member is rotated from full-open to full-closed position, to any of its intermediate positions, the longitudinal grooves in the valve seat are disconnected from the source of lubricant under pressure, so that, while such grooves may be exposed by the transverse openings in the valve member or valve seat during the rotation of said valve member, any loss of lubricant will be limited to the small amount in the grooves so exposed and this will be immediately replaced when communication with the lubricant chamber is restored by rotating the valve member to either the full-open or full-closed position.

It is also to be understood that the short longitudinal connecting grooves indicated as grooves 44 in Figure 6 and as grooves 56 in Figure 9 may be made of a width such as to provide connection between the ends of the lubricant passageway 49 and the various grooves on the surface of contact of valve member and valve body for positions of the valve member substantially varying from full-open or full-closed positions as desired, provided that the said grooves 44 or 56 provide a cut-off before the main longitudinal grooves are exposed to the line fluid.

It will be observed that with this arrangement of the grooves the stop devices as described above to limit the rotation of the plug member may be dispensed with if desired, and will be, of course, not employed in the case of the 3-way valve shown in Figure 10, unless for some special purposes.

Having thus described my invention and illustrated its use, what I claim as new and desire to secure by Letters Patent is:

1. In a valve structure, in combination, a valve body having a seat and a valve member engaging said seat, fluid passageways in said body and a transverse port in said valve member adapted to register with said passageways when in open position, a lubricant reservoir in said valve structure and a lubricant duct therefrom communicating with the surface of contact between said valve member and body, means for distributing the lubricant over said surface, including communicating circumferential and longitudinal grooves in said surface adapted for connection with said duct only when the valve member is in certain predetermined positions.

2. In a valve structure, in combination, a valve body having a seat and a valve member engaging said seat, fluid passageways in said body and a transverse port in said valve member adapted to register with said passageways when in open position, a lubricant reservoir in said valve structure and a lubricant duct therefrom communicating with the surface of contact between said valve member and body, means for distributing the lubricant over said surface, including communicating circumferential and longitudinal grooves in said surface adapted for connection with said duct only when the valve member is in full-open or full-closed position.

3. In a valve structure, in combination, a valve body having a seat and a valve member engaging said seat, fluid passageways in said body and a transverse port in said valve member adapted to register with said passageways when in open position, a lubricant reservoir in said valve structure and a lubricant duct therefrom communicating with the surface of contact between said valve member and body, means for distributing the lubricant over said surface including circumferential grooves in said body above and below said passageways, longitudinal grooves in said body communicating with said circumferential grooves, and means for establishing communication between said grooves and said lubricant duct only in certain predetermined positions of said valve member.

4. In a valve structure, in combination, a valve body having a seat and a valve member engaging said seat, fluid passageways in said body and a transverse port in said valve member adapted to register with said passageways when in open position, a lubricant reservoir in said valve structure and a lubricant duct therefrom communicating with the surface of contact between said valve member and body, means for distributing the lubricant over said surface including communicating circumferential and longitudinal grooves in said surface adapted for connection with said duct to form a substantially complete seal around said port only when the valve member is in certain predetermined positions.

5. In a valve structure, in combination, a valve body having a seat and a valve member engaging said seat, fluid passageways in said body and a tranverse port in said valve member adapted to register with said passageways when in open position, a lubricant reservoir in said valve structure and a lubricant duct therefrom communicating with the surface of contact between said valve member and body, means for distributing the lubricant over said surface including connected circumferential and longitudinal grooves therein displaced out of communication with said lubricant supply duct, and means for establishing communication between said lubricant supply duct and one of said grooves only when the valve member is in certain predetermined positions.

6. In a valve structure, in combination, a valve body having a seat and a valve member engaging said seat, fluid passageways in said body and a transverse port in said valve member adapted to register with said passageways when in open position, a lubricant reservoir in said valve structure and a lubricant duct therefrom communicating with the surface of contact between said valve member and body, means for distributing the lubricant over said surface including connected circumferential and longitudinal grooves therein displaced out of communication with said lubricant supply duct, and means comprising a lateral extension of one of said grooves, for establishing communication between said lubricant supply duct and one of said grooves when the valve member is in certain predetermined positions.

7. In a valve structure, in combination, a valve body having a seat and a valve member engaging said seat, fluid passageways in said body and a transverse port in said valve member adapted to register with said passageways when in open position, a lubricant reservoir in said valve structure and a lubricant duct therefrom communicating with the surface of contact between said valve member and body, means for distributing the lubricant over said surface, including communicating circumferentially and longitudinal grooves in said surface adapted for connection with said duct only when the valve member is in certain predetermined positions, said lubricant duct being located between one end of the surface of contact and the adjacent one of said circumferential grooves.

8. In a valve structure, in combination, a valve body having a seat and a valve member engaging said seat, fluid passageways in said body and a transverse port in said valve member adapted to register with said passageways when in open position, a lubricant reservoir in said valve structure and a lubricant duct therefrom communicating with the surface of contact between said valve member and body, means for distributing the lubricant over said surface, including communicating circumferential and longitudinal grooves in said surface adapted for connection with said duct only when the valve member is in certain predetermined positions, said lubricant duct being located in said surface of contact between and spaced from said circumferential grooves.

9. In a valve structure, in combination, a valve body having a seat and a valve member engaging said seat, angularly related fluid passageways in said body and complementally formed ports in said valve member adapted to register with said passageways when in certain positions, a lubricant reservoir in said valve structure and a lubricant duct therefrom communicating with the surface of contact between said valve member and body, means for distributing the lubricant over said surface, including communicating circumferential and longitudinal grooves in said surface adapted for connection with said duct only when the valve member is in certain predetermined positions.

10. In a valve structure, in combination, a valve body having a seat and a valve member engaging said seat, angularly related fluid passageways in said body and complementally formed ports in said valve member adapted to register with said passageways when in certain positions, a lubricant reservoir in said valve structure and a lubricant duct therefrom communicating with the surface of contact between said valve member and body, means for distributing the lubricant over said surface, including communicating circumferential and longitudinal grooves in said surface adapted for connection with said duct only when the valve member is in certain predetermined positions, said longitudinal grooves being so located that certain of them lie between adjacent angularly related passageways in predetermined positions of the valve member.

11. In a valve structure, in combination, a valve body having a seat and a valve member engaging said seat, fluid passageways in said body and a transverse port in said valve member adapted to register with said passageways when in open position, a lubricant reservoir in said valve structure and a lubricant duct therefrom communicating with the surface of contact between the valve member and body, means for distributing the lubricant over said surface including continuous circumferential grooves above and below said port, longitudinal grooves connected to said circumferential grooves and disposed adjacent the port on each side of the openings thereof, all of said grooves being spaced from the lubricant duct, and short longitudinal grooves adapted to bridge the space between the duct and the other said grooves to establish communication therebetween in the open and closed positions only of the valve to completely seal around the port and passageways.

12. In a valve structure, in combination, a valve body having a seat and a valve member engaging said seat, fluid passageways in said body and a port in said valve member adapted to register with said passageways when in open position, a lubricant reservoir in said valve structure having a duct therefrom communicating with the surface of contact between said valve member and body and means for distributing lubricant over said surface, including longitudinal and circumferential grooves therein adapted for communication with said duct only when the valve member is in certain predetermined positions.

13. In a valve structure, in combination, a body having a seat and a valve member engaging said seat, fluid passageways in said body and a port in said valve member adapted to register in said passageways when in open position, a lubricant reservoir in said valve structure having a duct therefrom communicating with the surface of contact between said valve member and body and means for distributing lubricant over said surface, including circumferential grooves therein adapted for communication with said duct only when the valve member is in certain predetermined positions.

14. In a valve structure, in combination, a valve body member having a seat and a valve member engaging said seat, fluid passageways in said body member and a port in said valve member adapted to register with said passageways when the valve member is in open position, longitudinal grooves in the seating surface of one of said members extending on each side of said port and passageway in the full-open and full-closed positions of said valve member and a reservoir for lubricant in the other said member having a duct extending therefrom into communication with diametrically opposite sides of said seating surfaces, said duct being overlapped by at least one of said longitudinal grooves in both the full open and full closed positions of the valve member, all of said grooves being disconnected from the reservoir supply when the valve member is rotated from said positions.

15. In a valve structure, in combination, a valve body member having a seat and a valve member engaging said seat, fluid passageways in said body member and a port in said valve member adapted to register with said passageways when the valve member is in open position, longitudinal grooves in the seating surface of one of said members extending on each side of said port and passageway in the full-open and full-closed positions of the valve member and a reservoir for lubricant in the other said member having a duct extending therefrom into communication with diametrically opposite sides of said seating surfaces, said duct being overlapped by at least one of said longitudinal grooves in the full open position of the valve member, all of said grooves being disconnected from the reservoir supply when the valve member is rotated from said position.

16. In a valve structure, in combination, a valve body member having a seat and a valve member engaging said seat, fluid passageways in said body member and a port in said valve member adapted to register with said passageways when the valve member is in open position, longitudinal grooves in the seating surface of one of said members extending on each side of said port and passageway in the full-open and full-closed positions of the valve member and a reservoir for lubricant in the other said member having a duct extending therefrom into communication with diametrically opposite sides of said seating surfaces, said duct being overlapped by at least one of said longitudinal grooves in the full closed position of the valve member, all of said grooves being disconnected from the reservoir supply when the valve member is rotated from said position.

FRENCH HUGH MOREHEAD.